United States Patent
Reischmann

(10) Patent No.: US 8,440,950 B1
(45) Date of Patent: May 14, 2013

(54) ROOFTOP SOLAR PANEL DEPLOYMENT AND TRACKING SYSTEM

(76) Inventor: Michael J. Reischmann, Eustis, FL (US)

( * ) Notice: Subject to any disclaimer, the term of this patent is extended or adjusted under 35 U.S.C. 154(b) by 332 days.

(21) Appl. No.: 12/927,153

(22) Filed: Nov. 8, 2010

Related U.S. Application Data

(63) Continuation-in-part of application No. 12/584,620, filed on Sep. 9, 2009, now abandoned.

(51) Int. Cl.
*F24J 2/38* (2006.01)

(52) U.S. Cl.
USPC ........................ 250/203.4; 126/573; 136/246

(58) Field of Classification Search ............... 250/203.1, 250/203.3, 203.4, 222.1; 126/572, 573, 600, 126/621, 623, 627; 136/244–246
See application file for complete search history.

(56) References Cited

U.S. PATENT DOCUMENTS

| | | | |
|---|---|---|---|
| 2009/0199846 A1* | 8/2009 | Collins et al. | 126/601 |
| 2009/0293932 A1* | 12/2009 | Augenbraun et al. | 136/244 |

* cited by examiner

*Primary Examiner* — Kevin Pyo

(57) ABSTRACT

A roof has a fixed roof section with a bottom, a top, sides and an exposed face. A solar panel has an exterior edge, an interior edge and side edges. The side edges have midpoints intermediate the interior and exterior edges. The solar panel has an outer face and an inner face. Tubing movably couples the solar panel with respect to the fixed roof section. A drive member is adapted to move the solar panel with respect to the fixed roof section. A control sub system includes a processor and a sensor. The processor is operatively coupled to the sensor. In this manner the position of the sun is determined. Also in this manner the drive member is activated and inactivated. Further in this manner the angular orientation of the solar panel may be varied. Finally in this manner the efficiency of the solar panel may be maximized.

9 Claims, 8 Drawing Sheets

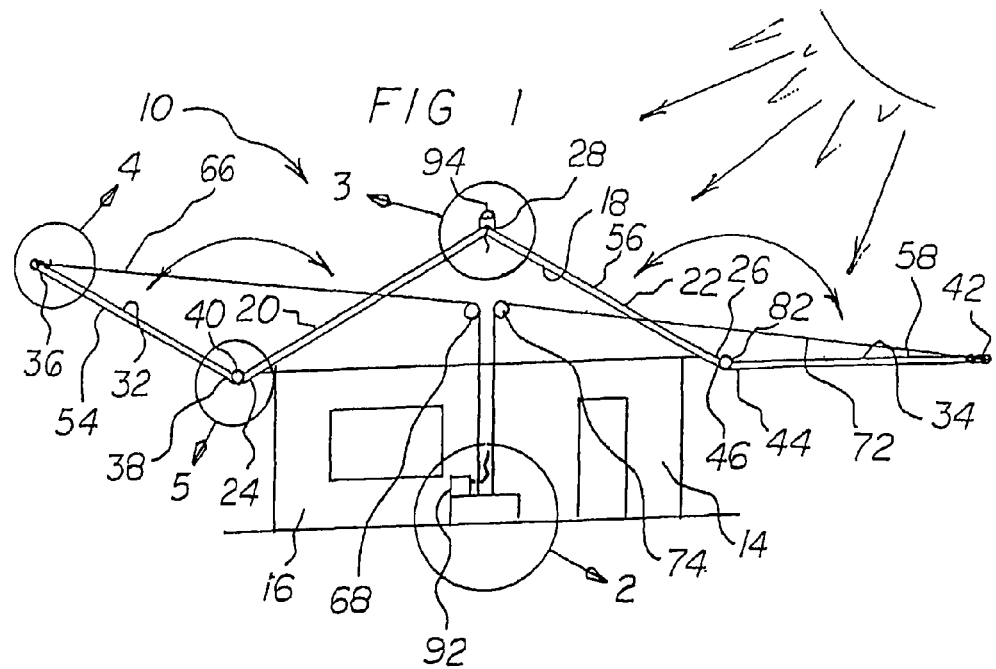
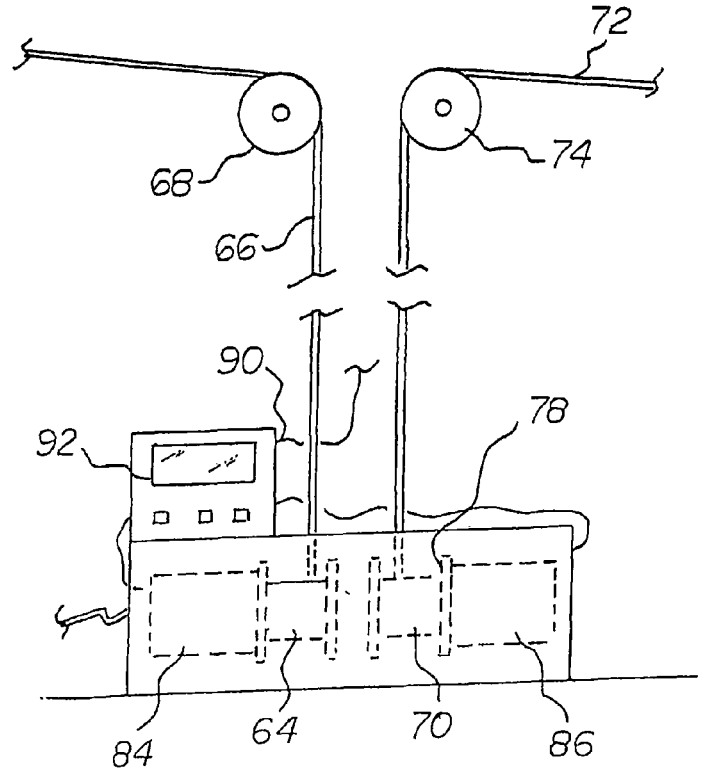

FIG 12
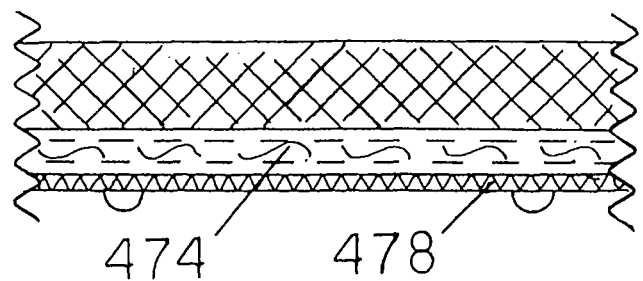
474  478
FIG 13
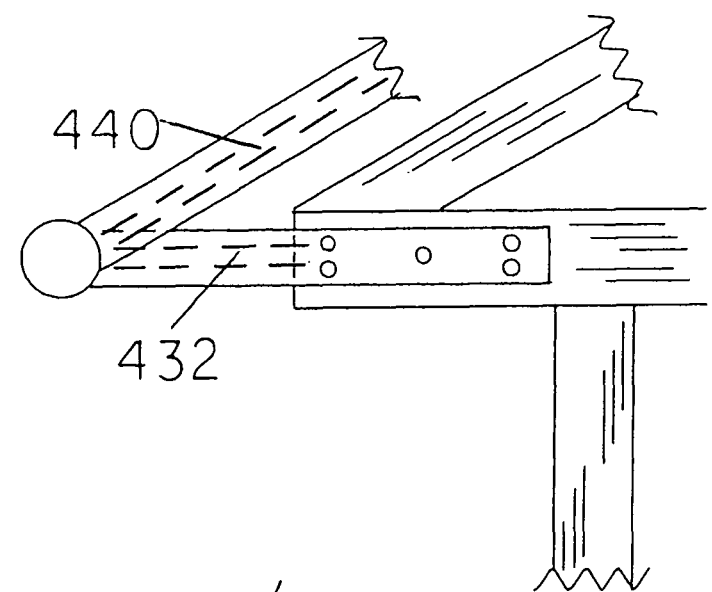
440
432
FIG 14
440
432  486
488

ROOFTOP SOLAR PANEL DEPLOYMENT AND TRACKING SYSTEM

RELATED APPLICATION

This application is a continuation-in-part application of pending U.S. patent application Ser. No. 12/584,620 filed Sep. 9, 2009 now abandoned, the subject matter of which is incorporated herein by reference.

FIELD OF THE INVENTION

The present invention relates to a rooftop solar panel deployment and tracking system and more particularly pertains to maximizing the generation of energy through a solar panel, the solar panel being repositionable in response to movement between the sun and the solar panel.

SUMMARY OF THE INVENTION

In view of the disadvantages inherent in the known types of solar panels of known designs and configurations now present in the prior art, the present invention provides an improved rooftop solar panel deployment and tracking system. As such, the general purpose of the present invention, which will be described subsequently in greater detail, is to provide a new and improved rooftop solar panel deployment and tracking system and method which has all the advantages of the prior art and none of the disadvantages.

To attain this, the present invention essentially comprises a rooftop solar panel deployment and tracking system. First provided is a building. The building has vertical walls. The vertical walls are provided below. The building has a roof. The roof is provided above. The roof has a fixed roof section. The fixed roof section has a top. The fixed roof section has a bottom. The bottom is provided parallel with the top. The fixed roof section has sides. The sides couple the top and the bottom. The fixed roof section has a fixed first angle. The fixed first angle is fixed with respect to the wall.

A solar panel is provided. The solar panel has an upper edge. The solar panel has a lower edge. The upper edge is provided parallel with the lower edge. The solar panel has side edges. The side edges are provided parallel with each other. The side edges couple the upper and lower edges. Each side edge has a mid-point. The mid-point is provided intermediate the upper and lower edges.

Provided next is a plurality of fixed tubes. The fixed tubes are provided parallel with each other. Each fixed tube has an interior end. The interior end of the fixed tube is attached to the roof adjacent to the bottom of the fixed roof section. Each fixed tube has an exterior end. A lower pivot tube is provided. The lower pivot tube couples the exterior ends of the fixed tubes. The lower pivot tube is provided parallel with the bottom of the fixed roof section and the lower edge of the solar panel.

Two rotatable tubes are provided. Each rotatable tube has an inner end. The inner end of each rotatable tube is pivotably coupled with respect to the exterior end of the fixed tubes. Each rotatable tube has an exterior end. The exterior end of each rotatable tube is pivotably coupled with respect to the mid-points of the side edges of the solar panel.

A first motor is provided. The first motor is adapted to facilitate the rotation of the rotatable tubes with respect to the fixed tubes. A second motor is provided. The second motor is adapted to rotate the solar panels with respect to the rotatable tubes.

Provided next is a water heater. The water heater is adapted to heat water. The heater has a lower heat transfer line. The lower heat transfer line has an input. The lower heat transfer line has an output. The lower heat transfer line extends through the water heater.

A fluid path is provided. The fluid path includes a manifold header. The manifold header is provided in the solar panel at the upper edge. The fluid path also includes a manifold footer. The manifold footer is provided in the solar panel at the lower edge. Parallel lines are provided. The parallel lines couple the header and footer. The fluid path extends from the output of the heat transfer line of the water heater then through one fixed tube and a first movable tube and into the manifold header. The fluid path also extends from the manifold footer then through a second movable tube and a second fixed tube and through the input of the heat transfer line of the water heater.

A heat transfer fluid is provided. The heat transfer fluid is movable through the fluid path. In this manner the heat transfer fluid may be heated by solar radiation at the solar panel. Further in this manner water in the water heater may be heated. The heat transfer fluid is chosen from the class of heat transfer fluids. The class of heat transfer fluids includes water and glycol.

Further provided is an opaque/translucent sheet. The opaque/translucent sheet is secured to the lower face of the solar panel heater. In this manner a shaded area is provided there beneath when positioned in a generally horizontal orientation to one side of the building.

Provided last is an adjustment assembly. In this manner angular orientation of the solar panels may be varied with respect to the fixed roof sections. The adjustment assembly includes a processor. The processor is located adjacent to one of the vertical walls. The processor includes a sensor. The sensor is preferably located on the roof of the building. The processor may be at other locations. The processor is operatively coupled to the first motor and the second motor and to the sensor. The sensor is adapted to determine the position of the sun with respect to the roof. In response to the determined position of the sun, the sensor activates and inactivates the first motor and the second motor. In this manner the angular orientation of the solar panel may be varied. Further in this manner the efficiency of the solar panel may be maximized.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rooftop solar panel deployment and tracking system which has all of the advantages of the prior art solar panels of known designs and configurations and none of the disadvantages.

It is another object of the present invention to provide a new and improved rooftop solar panel deployment and tracking system which may be easily and efficiently manufactured and marketed.

It is further object of the present invention to provide a new and improved rooftop solar panel deployment and tracking system which is of durable and reliable constructions.

An even further object of the present invention is to provide a new and improved rooftop solar panel deployment and tracking system which is susceptible of a low cost of manufacture with regard to both materials and labor, and which accordingly is then susceptible of low prices of sale to the consuming public, thereby making such rooftop solar panel deployment and tracking system economically available to the buying public.

Even still another object of the present invention is to provide a rooftop solar panel deployment and tracking system for maximizing the generation of electrical energy through a solar panel, the solar panel being repositionable in response to movement between the sun and the solar panel.

Lastly, it is an object of the present invention to provide a new and improved rooftop solar panel deployment and tracking system. A roof has a fixed roof section with a bottom, a top, sides and an exposed face. A solar panel has an exterior edge, an interior edge and side edges. The side edges have midpoints intermediate the interior and exterior edges. The solar panel has an outer face and an inner face. Tubing movably couples the solar panel with respect to the fixed roof section. A drive member is adapted to move the solar panel with respect to the fixed roof section. A control sub system includes a processor and a sensor. The processor is operatively coupled to the sensor. In this manner the position of the sun is determined. Also in this manner the drive member is activated and inactivated. Further in this manner the angular orientation of the solar panel may be varied. Finally in this manner the efficiency of the solar panel may be maximized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a rooftop solar panel deployment and tracking system constructed in accordance with the principles of the present invention.

FIGS. 2, 3, 4 and 5 are enlarged illustrations of portions of the system taken at Circles 2, 3, 4 and 5 of FIG. 1.

FIG. 12 is an enlarged cross sectional view of a portion of the system taken at circle 12 of FIG. 11.

FIG. 13 is a side elevational view of the attachment of the system to a roof rafter of a building.

FIG. 14 is a side elevational view of the attachment of the system to a flat roof of a building.

The same reference numerals refer to the same parts throughout the various Figures.

DESCRIPTION OF THE PREFERRED EMBODIMENT

Figure 3:
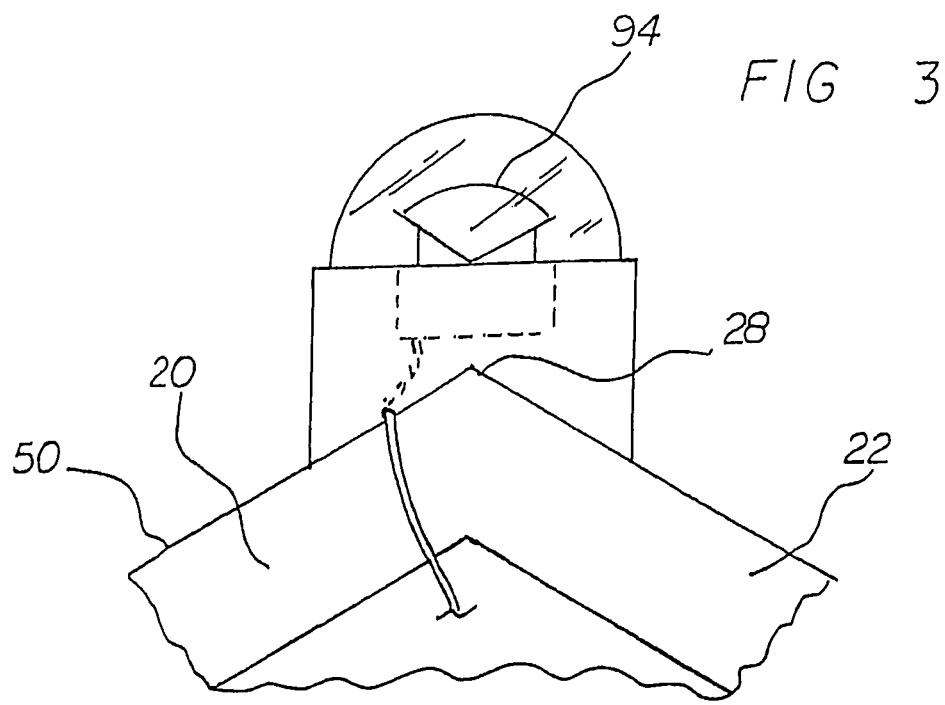
Figure 4:
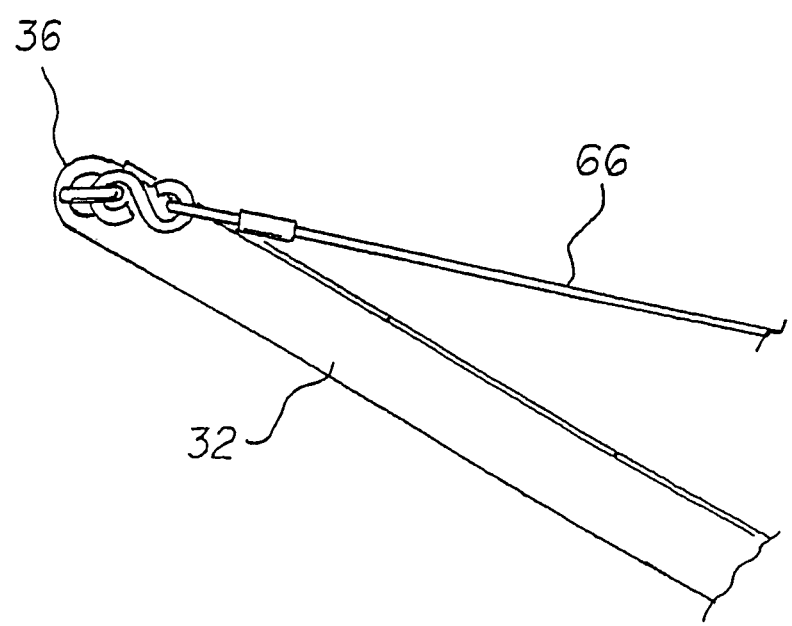
Figure 5:
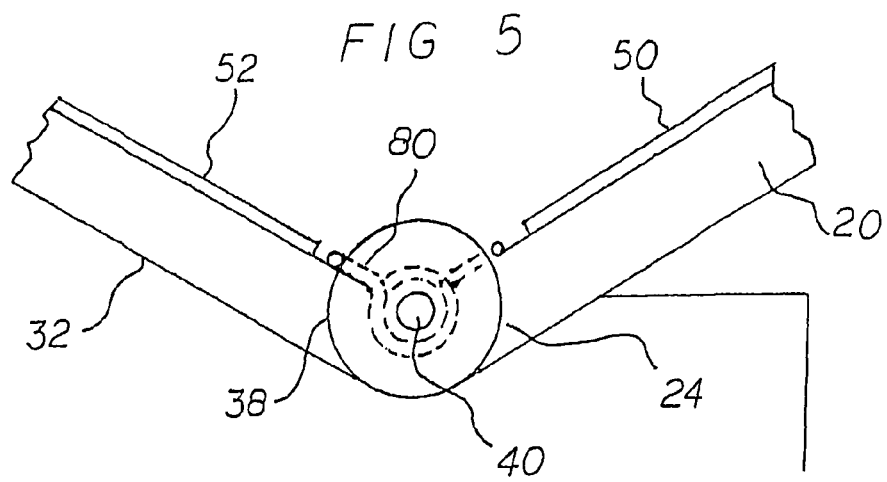
Figure 6:
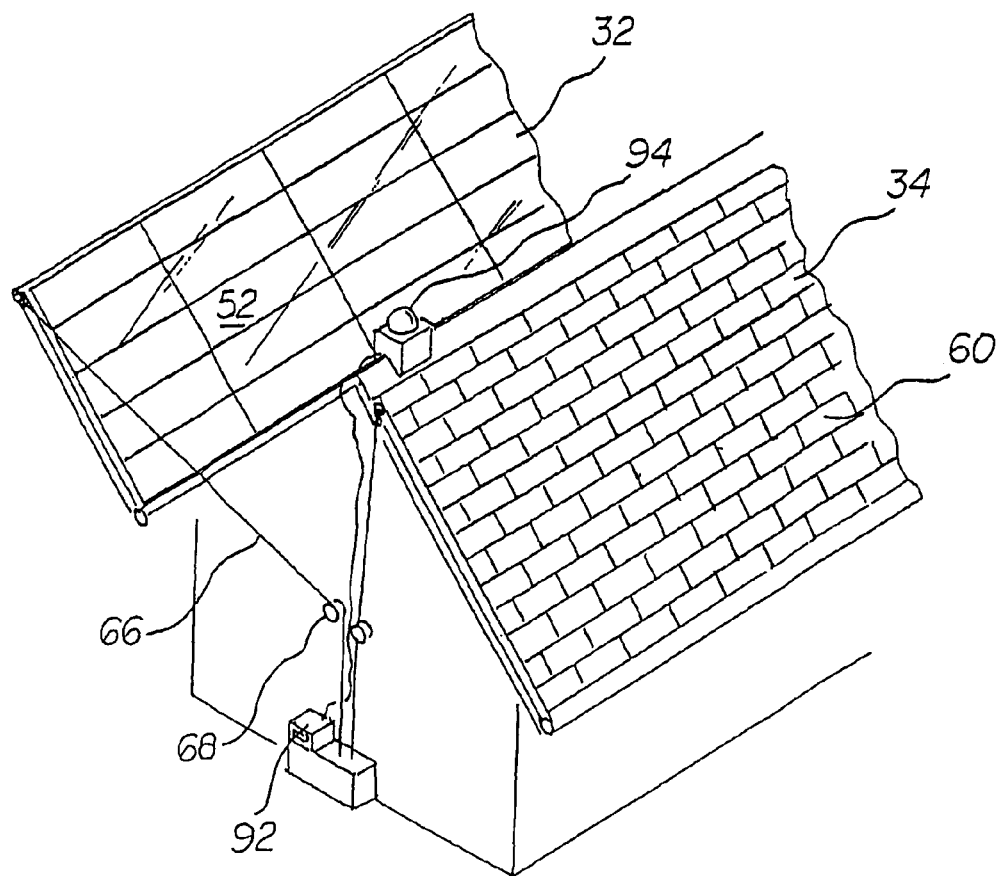
FIG. 6 is a perspective illustration of the system shown in the prior Figures.

With reference now to the drawings, and in particular to FIG. 1 thereof, a first embodiment of the new and improved rooftop solar panel deployment and tracking system embodying the principles and concepts of the present invention and generally designated by the reference numeral 10 will be described.

The present invention, the rooftop solar panel deployment and tracking system 10 is comprised of a plurality of components. Such components in their broadest context include a roof, a winch and a control sub system.

A rooftop solar panel deployment and tracking system 10 is for maximizing the generation of electrical energy through solar panel arrays repositionable in response to movement between the sun and the solar panel arrays. The maximizing is done in an efficient, convenient, economical and eye-appealing manner. First provided is a building 14 with vertical walls 16 below and a roof 18 above. The roof has a first fixed roof section 20 with a first lower edge 24. The roof also has a second fixed roof section 22 with a second lower edge 26. Each fixed roof section has a fixed first angle with respect to the walls. The fixed roof sections have a common top edge 28.

Next provided is a first movable roof section 32 with a free exterior edge 36. The first movable roof section also has an interior edge 38 with a first hinge 40 pivotally coupled to the first lower edge.

Also provided is a second movable roof section 34 with a free exterior edge 42. The second movable roof section has an interior edge 44 with a second hinge 46 pivotally coupled to the second lower edge.

The first fixed roof section has an exposed face with a fixed solar panel array 50. The first movable roof section has an inner face with a first movable solar panel array 52. The first movable roof section has an outer face with a surface of a roofing material 54.

The second fixed roof section has an exposed face with a second fixed solar panel array 56. The second movable roof section has an inner face with a second movable solar panel array 58. The second movable roof section has an outer face with a surface of a roofing material 60.

Next provided is a first winch 64 with a first cable 66. The first cable has a first end attached to the first winch and a second end attached to the exterior edge of the first movable roof section. A first pulley 68 between the first and second ends of the first cable contacts and redirects the first cable.

Next provided is a second winch 70 with a second cable 72. The second cable has a first end attached to the second winch and a second end attached to the exterior edge of the second movable roof section. A second pulley 74 between the first and second ends of the second cable contacts and redirects the second cable.

An adjustment assembly 78 is next provided for varying the angular orientation of the movable roof sections with respect to the fixed roof sections. The adjustment assembly includes a first spring 80 urging the first movable roof section from a closed orientation adjacent to the first fixed roof section to an open orientation rotated away from the first fixed roof section. A second spring 82 urges the second movable roof section from a closed orientation adjacent to the second fixed roof section to an open orientation rotated away from the second fixed section. A first motor 84 rotates the first winch to reel in and out the first cable to move the first movable roof section to a first angular open orientation. A second motor 86 rotates the second winch to reel in and out the second cable to move the second movable roof section to a second angular open orientation.

Lastly, a control sub system 90 is provided. The control sub system includes a processor 92 located adjacent to one of the vertical walls. The control subs system also includes a sensor 94 located on the roof of the building. The processor is operatively coupled to the first motor and the second motor and to the sensor. The sensor is adapted to determine the position of the sun with respect to the roof. The sensor, in response to the determined position of the sun, activates and inactivates the first motor to vary the first angular open orientation of the first movable section for maximizing the efficiency of the first movable solar panel array. The sensor also activates and inactivate the second motor to vary the second angular open orientation of the second movable section for maximizing the efficiency of the second movable solar panel array.

Figure 7:
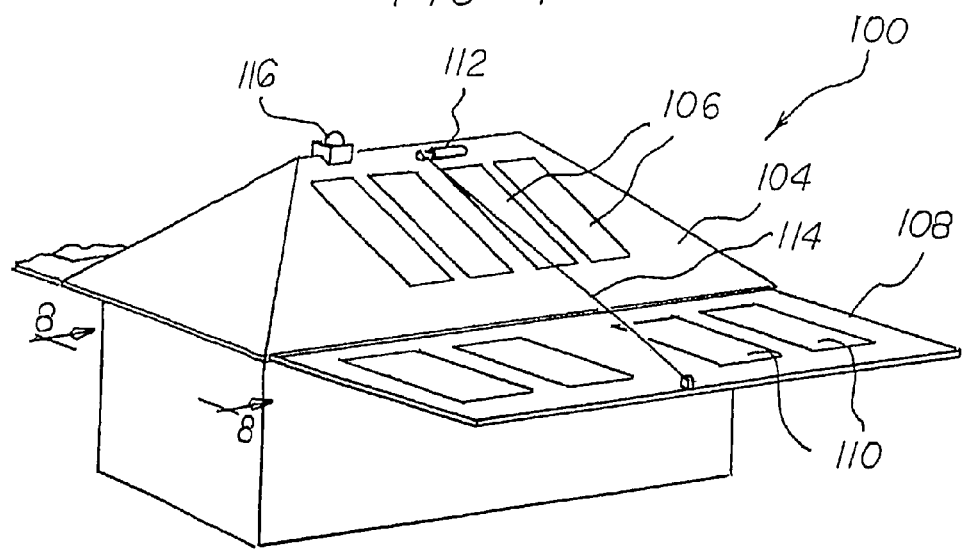
FIG. 7 is a perspective illustration of a system constructed in accordance with an alternate embodiment of the invention.
Figure 8:
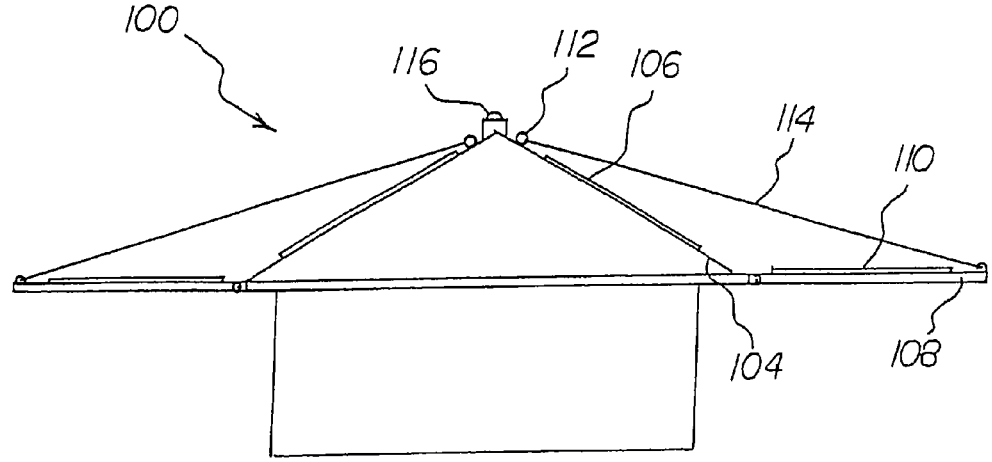
FIG. 8 is an end elevational view taken at line 8-8 of FIG. 7.

An alternate embodiment of the invention is illustrated in FIGS. 7 and 8. In this embodiment, the system 100 further includes a second fixed roof section 104 with a second fixed solar panel array 106. Included in this embodiment is a second movable roof section 108 with a second movable solar panel array 110. Also, in this embodiment, a second winch 112 with a second cable 114 is provided to vary the angular open orientation of the second movable roof section for maximizing the efficiency of the second movable solar panel array. Further in this embodiment, the sensor 116 is adapted to also activate and inactivate the second winch to vary the angular open orientation of the second movable roof section for maximizing the efficiency of the second movable solar panel array. In this embodiment, the winches being located on the roof.

Figure 9:
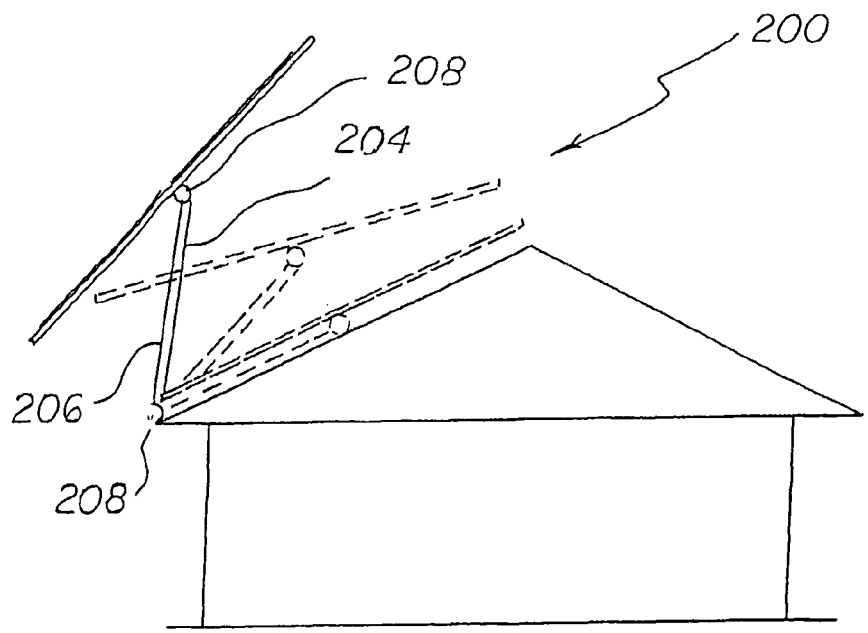
FIGS. 9 and 10 are end elevational views illustrating additional alternate embodiment of the invention.
Figure 10:
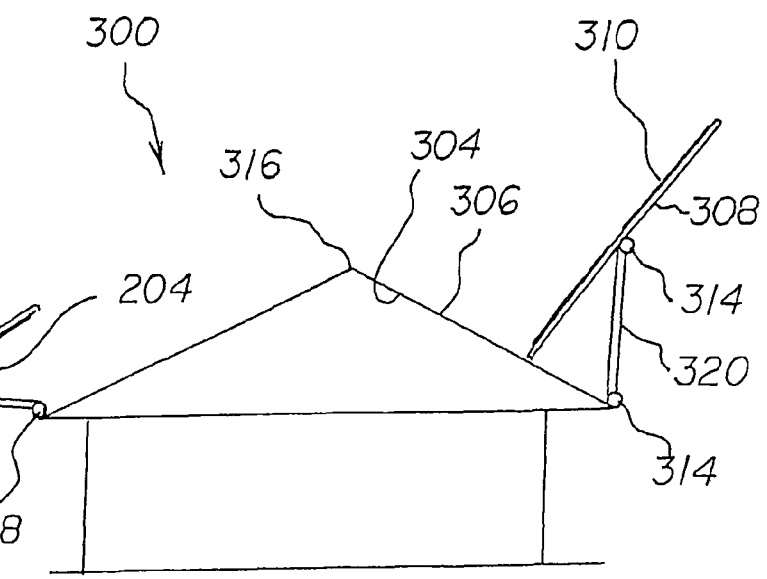

Additional alternate embodiments are illustrated in FIGS. 9 and 10. In the FIG. 9 embodiment 200, the pivotable member 204 coupling the movable roof section with respect to the fixed roof section includes a fulcrum arm 206. The fulcrum arm extends between the lower edge of the fixed roof section and a central extent of the movable roof section. The fulcrum arm supports at least a portion of the drive member 208.

In the FIG. 10 embodiment 300, the system further includes a supplemental fixed roof section 304 with a supplemental fixed solar panel array 306. Also provided is a supplemental movable roof section 308 with a supplemental movable solar panel array 310. A supplemental drive member 314 functions to vary the angular open orientation of the supplemental movable roof section for maximizing the efficiency of the supplemental movable solar panel array. In addition, the sensor 316 is adapted to also activate and inactivate the supplemental drive member to vary the angular open orientation of the supplemental movable roof section for maximizing the efficiency of the supplemental movable solar panel array.

In this embodiment, the drive member and the supplemental drive member each includes a fulcrum arm 320 between the lower edge of the fixed roof section and a central extent of the movable roof section. The fulcrum arms each support, respectively, at least a portion of the drive member and the supplemental drive member.

The following is information on design principles, limitations, and requirements for the present invention. Regarding the photo-voltaic panel angles, a rough guide to the desired angles for optimum efficiency is as follows:

Early February: panel at the same angle as latitude.
Early May: panel at latitude minus 15 degrees.
Early August: panel at the same angle as latitude.
Early November: panel at latitude plus 15 degrees.
For example, in Eustis (28° N) the angle would vary between (28+15=) 43 max, and (28−15=) 13 minimum. Note the drawings of total range of motion. At 45 degrees' latitude the range of motion would need to be (45+15=) 60 max, and (45−15=) 30 minimum. Note the drawings of total range of motion required.

Typical roof pitch in the southern United States is 5:12 to 6:12, (23 to 28 degrees), so the summer angle is not attainable below latitudes of 38 to 43 degrees with typical roof pitch between 23 and 28 degrees, or at higher latitudes on buildings with steeper pitch. The spring and fall panel angles will not be attainable below 23 to 28 degrees latitude, depending on roof pitch. Any building with steeper than standard pitch will present problems much further north.

Tilting the panels from one edge limits installation of photo-voltaic panels to the South facing roof. Idea: Tilting the panels around a central axis allows photo-voltaic panel installation on South and North facing roof areas. Also allows optimum panel angles at any latitude. Since the present invention uses a photo-voltaic panel tracking mechanism, it offers optimum panel angles, as does the competition. Dual axis design increases cost, but expands uses.

For example, in summer, a dual axis tracker can deploy photo-voltaic panels as sun shades to prevent heat entering the house. This saves energy and lowers air conditioning costs.

The advantages of the present invention include:

There is no undesired blocking of windows, so full length of roof line can be used.

The panels can be mounted on North or South side of roof, or both, depending on area required, shadows, aesthetics, etc.

The panels on north and south sides of roof are equally and optimally efficient.

The panels mounted on the North side of the roof can be raised to a higher altitude to rise above the shade line of the roof ridge. The correct panel angle will be maintained at all times, as the panel angle can be controlled independently from the main fulcrum arm angle.

When the underside of the panels is covered with Sunbrella, aluminum or fiberglass panel etc, to hide the structure, then the panel can be lowered to be used as a sun shade, and still be aesthetically pleasing.

The entire assembly can be lowered for inspection or maintenance. There is no need to climb on roofs, thereby avoiding danger and potential damage to roofs, particularly tile roofs.

The panels are stored in a safe mode with the glass side down against the roof or rotated down against the wall or ground level in case of hurricanes or hail. Roof mounted retaining brackets are needed for security in high winds.

Depending on roof shape and size, the panels can be configured to rotate about the long or short axis.

Multiple axes can be mounted on a single fulcrum arm, if panels are deployed horizontally.

A simple push-rod or chain drive arrangement will keep the correct panel angle, regardless of fulcrum arm angle.

The drive member in the primary embodiment is illustrated as a cable and a winch. It should be understood that the drive member is adapted to be any of a plurality of drive members chosen from the class of drive members including cables/winches, manual, electric motors, pneumatic drivers and hydraulic drivers.

It should also be understood that the present invention is adapted to be utilized on any of a wide variety of roofs including, but not limited to, gable, roofs, cross gabled roofs, mansard roofs, hip roofs, pyramid hip roofs, cross hipped roofs, saltbox roofs, gambrel roofs, flat roofs, bonnet roofs and shed roofs.

Figure 11:
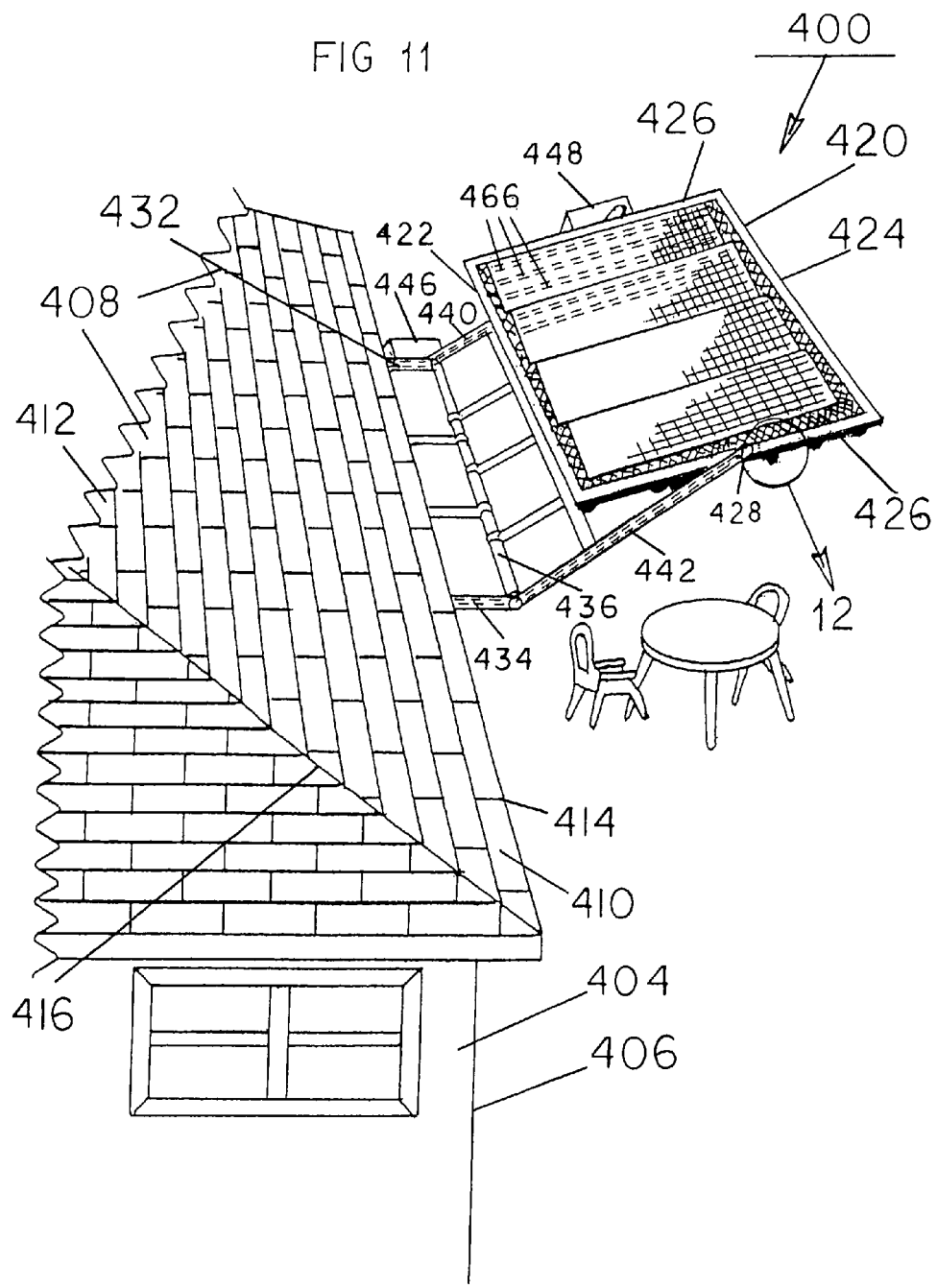
FIG. 11 is a perspective illustration of a solar roof panel deployment and tracking system constructed in accordance with the primary embodiment of the invention.
Figure 15:
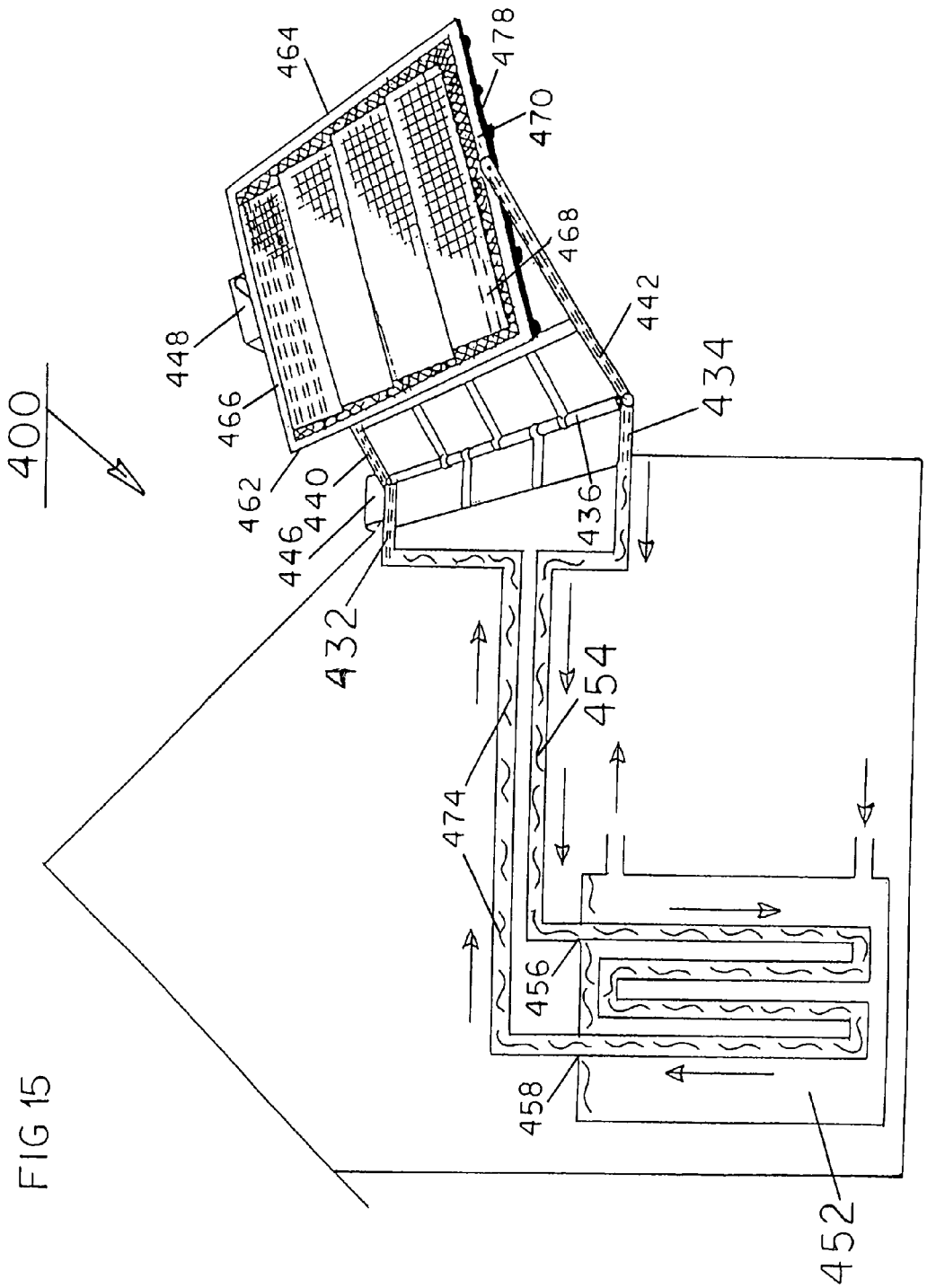
FIG. 15 is a perspective showing similar to FIG. 11 but illustrating heated liquid being providing to a heat exchanger for heating water.

With reference now to the drawings, and in particular to FIG. 11 thereof, the preferred embodiment of the new and improved rooftop solar panel deployment and tracking system embodying the principles and concepts of the present invention and generally designated by the reference numeral 400 will be described.

The present invention, the rooftop solar panel deployment and tracking system 400 is comprised of a plurality of components. Such components in their broadest context include a roof, a solar panel, tubing, a drive member, and a control sub system. Such components are individually configured and correlated with respect to each other so as to attain the desired objective.

First provided is a building 404. The building has vertical walls 406. The vertical walls are provided below. The building has a roof 408. The roof is provided above. The roof has a fixed roof section 410. The fixed roof section has a top 412. The fixed roof section has a bottom 414. The bottom is provided parallel with the top. The fixed roof section has sides 416. The sides couple the top and the bottom. The fixed roof section has a fixed first angle. The fixed first angle is fixed with respect to the wall.

A solar roof panel 420 is provided. The solar roof panel has an upper edge 422. The solar roof panel has a lower edge 424. The upper edge is provided parallel with the lower edge. The solar roof panel has side edges 426. The side edges are provided parallel with each other. The side edges couple the upper and lower edges. Each side edge has a mid-point 428. The mid-point is provided intermediate the upper and lower edges.

Provided next is a plurality of fixed tubes 432, 434. The fixed tubes are provided parallel with each other. Each fixed tube has an interior end. The interior end of the fixed tube is attached to the roof adjacent to the bottom of the fixed roof section. Each fixed tube has an exterior end. A lower pivot tube 436 is provided. The lower pivot tube couples the exterior ends of the fixed tubes. The lower pivot tube is provided parallel with the bottom of the fixed roof section and the lower edge of the solar roof panel.

Two rotatable tubes 440, 442 are provided. Each rotatable tube has an inner end. The inner end of each rotatable tube is pivotably coupled with respect to the exterior end of the fixed tubes. Each rotatable tube has an exterior end. The exterior end of each rotatable tube is pivotably coupled with respect to the mid-points of the side edges of the solar roof panel.

A first motor 446 is provided. The first motor is adapted to facilitate the rotation of the rotatable tubes with respect to the fixed tubes. A second motor 448 is provided. The second motor is adapted to rotate the solar roof panels with respect to the rotatable tubes.

Provided next is a water heater 452. The water heater is adapted to heat water. The heater has a lower heat transfer line 454. The lower heat transfer line has an input 456. The lower heat transfer line has an output 458. The lower heat transfer line extends through the water heater.

A fluid path is provided. The fluid path includes a manifold header 462. The manifold header is provided in the solar roof panel at the upper edge. The fluid path also includes a manifold footer 464. The manifold footer is provided in the solar roof panel at the lower edge. Parallel lines 466, 468, 470 are provided. The parallel lines couple the header and footer. The fluid path extends from the output of the heat transfer line of the water heater then through one fixed tube 432 and a first movable tube 440 and into the manifold header. The fluid path also extends from the manifold footer then through a second movable tube 466 and a second fixed tube 468 and through the input of the heat transfer line of the water heater.

A heat transfer fluid 474 is provided. The heat transfer fluid is movable through the fluid path. In this manner the heat transfer fluid may be heated by solar radiation at the solar roof panel. Further in this manner water in the water heater may be heated. The heat transfer fluid is chosen from the class of heat transfer fluids. The class of heat transfer fluids includes water and glycol.

Further provided is an opaque/translucent sheet 478. The opaque/translucent sheet is secured to the lower face of the solar panel heater. In this manner a shaded area is provided there beneath when positioned in a generally horizontal orientation to one side of the building.

Provided last is an adjustment assembly. In this manner angular orientation of the solar roof panels may be varied with respect to the fixed roof sections. The adjustment assembly includes a processor. The processor is located adjacent to one of the vertical walls. The processor includes a sensor. The sensor is located on the roof of the building. The processor is operatively coupled to the first motor and the second motor and to the sensor. The sensor is adapted to determine the position of the sun with respect to the roof. In response to the determined position of the sun, the sensor activates and inactivates the first motor and the second motor. In this manner the angular orientation of the solar panel may be varied. Further in this manner the efficiency of the solar roof panel may be maximized.

Alternate embodiments of the invention are illustrated in FIGS. 13 and 14. 7. In FIG. 13, the tubing includes pivotable tubes 440 and fixed tubes 432. Further included are coupling components securing the fixed tubes with respect to roof rafters of a building. Note FIG. 13.

In FIG. 14, the tubing includes pivotable tubes 440 and fixed tubes 432. Further included are coupling components 486 securing the fixed tubes with respect to a flat roof of a building. Further included is a vertical support post 488 with a fixed lower end and an upper end attached with respect to a fixed tube. Note FIG. 14.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rooftop solar panel deployment and tracking system comprising:
    a roof having a fixed roof section with a bottom and a top and sides and an exposed face;
    a solar panel with an exterior edge and an interior edge and side edges, the side edges having midpoints intermediate the interior and exterior edges, the solar panel having an outer face and an inner face;
    tubing movably coupling the solar panel with respect to the fixed roof section;
    a drive member adapted to move the solar panel with respect to the fixed roof section; and
    a control sub system including a processor and a sensor, the processor operatively coupled to the sensor to determine the position of the sun and in response to the determined position to activate and inactivate the drive member to vary the angular orientation of the solar panel for maximizing the efficiency of the solar panel.

2. The system as set forth in claim 1 wherein the tubing includes a plurality of parallel fixed tubes, each fixed tube having an interior end attached to the roof adjacent to the bottom of the fixed roof section, each fixed tube having an exterior end with a lower pivot tube coupling the exterior ends of the fixed tubes, the lower pivot tube being parallel with the bottom of the fixed roof section and the lower edge of the solar panel, the tubing also including two rotatable tubes, each rotatable tube having an inner end pivotably coupled with respect to the exterior end of the fixed tubes, each rotatable tube having an exterior end pivotably coupled with respect to the mid-points of the side edges of the solar panel.

3. The system as set forth in claim 2 wherein the drive member includes a first motor adapted to facilitate the rotation of the rotatable tubes with respect to the fixed tubes, the drive member also including a second motor adapted to rotate the solar panels with respect to the rotatable tubes.

4. The system as set forth in claim 1 wherein the tubing includes a plurality of tubes in the solar panel.

5. The system as set forth in claim 4 wherein the plurality of tubes includes a manifold header in the solar panel at the upper edge, the fluid path also including a manifold footer in the solar panel at the lower edge and parallel lines coupling the header and footer.

6. The system as set forth in claim 4 and further including a heat transfer fluid movable through the plurality of tubes, the heat transfer fluid being chosen from the class of heat transfer fluids including water and glycol.

7. The system as set forth in claim 1 wherein the tubing includes pivotable tubes and fixed tubes and further including coupling components securing the fixed tubes with respect to roof rafters of a building.

8. The system as set forth in claim 1 wherein the tubing includes pivotable tubes and fixed tubes and further including coupling components securing the fixed tubes with respect to a flat roof of a building, and further including a vertical support post with a fixed lower end and an upper end attached with respect to a fixed tube.

9. A rooftop solar panel deployment and tracking system for maximizing the generation of electrical energy through a solar roof panel, the solar roof panel being repositionable in response to movement between the sun and the solar roof panel, the system comprising, in combination:
    a building with vertical walls below and a roof above, the roof having a fixed roof section with a top and a parallel bottom and sides coupling the top and the bottom, the fixed section having a fixed first angle with respect to the wall;
    a solar roof panel having an upper edge and a parallel lower edge and parallel side edges coupling the upper and lower edges, each side edge having a mid-point intermediate the upper and lower edges;
    a plurality of parallel fixed tubes, each fixed tube having an interior end attached to the roof adjacent to the bottom of the fixed roof section, each fixed tube having an exterior end with a lower pivot tube coupling the exterior ends of the fixed tubes, the lower pivot tube being parallel with the bottom of the fixed roof section and the lower edge of the solar roof panel;
    two rotatable tubes, tubes, each rotatable tube having an inner end pivotably coupled with respect to the exterior end of the fixed tubes, each rotatable tube having an exterior end pivotably coupled with respect to the mid-points of the side edges of the solar roof panel;
    a first motor adapted to facilitate the rotation of the rotatable tubes with respect to the fixed tubes, a second motor adapted to rotate the solar roof panels with respect to the rotatable tubes;
    a water heater adapted to heat water, the heater having a lower heat transfer line with an input and an output extending through the water heater;
    a fluid path including a manifold header in the solar roof panel at the upper edge, the fluid path also including a manifold footer in the solar roof panel at the lower edge and parallel lines coupling the header and footer, the fluid path extending from the output of the heat transfer line of the water heater then through one fixed tube and a first movable tube and into the manifold header, the fluid path also extending from the manifold footer then through a second movable tube and a second fixed tube and through the input of the heat transfer line of the water heater;
    a heat transfer fluid movable through the fluid path for being heated by solar radiation at the solar roof panel and for heating water in the water heater, the heat transfer fluid being chosen from the class of heat transfer fluids including water and glycol;
    an opaque/translucent sheet secured to the lower face of the solar roof panel heater to provide a shaded area there beneath when positioned in a generally horizontal orientation to one side of the building; and
    an adjustment assembly for varying the angular orientation of the solar roof panels with respect to the fixed roof sections, the adjustment assembly including a processor located adjacent to one of the vertical walls and including a sensor located on the roof of the building, the processor being operatively coupled to the first motor and the second motor and to the sensor, the sensor adapted to determine the position of the sun with respect to the roof and in response to the determined position of the sun to activate and inactivate the first motor and the second motor to vary the angular orientation of the solar roof panel for maximizing the efficiency of the solar roof panel.

\* \* \* \* \*